Patented Jan. 10, 1950

2,493,987

UNITED STATES PATENT OFFICE 2,493,987

ALUMINUM SALTS OF ALKYLATED PHENOL SULFIDES

Pharis Miller, Mountainside, N. J., and Eugene Lieber, New York, N. Y., assignors to Standard Oil Development Company, a corporation of Delaware No Drawing. Original application December 27, 1939, Serial No. 311,118. Divided and this application October 18, 1944, Serial No. 559,255

10 Claims. (Cl. 260—448)

This invention relates to a novel type of metal compound and methods of preparing same.

This is a division of our copending application Serial No. 311,118, filed December 27, 1939, now issued as Patent Number 2,362,290, granted November 7, 1944.

This invention relates particularly to the preparation of an aluminum salt of tertiary amyl phenol thio-ether, which might also be called a sulfide of an aluminum tertiary amyl phenolate. It is believed to have the formula, shown in its simplest form as:

$[(C_5H_{11}-C_6H_3-O)_2S]_3Al_2$ which may be written out more in detail as follows:

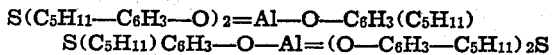
$S(C_5H_{11}-C_6H_3-O)_2=Al-O-C_6H_3(C_5H_{11})$
$S(C_5H_{11})C_6H_3-O-Al=(O-C_6H_3-C_5H_{11})_2S$ If the various groups attached to the aromatic nucleus are so positioned that the amyl group is in an ortho position to the oxygen and the sulfur linkage is in a meta position to the oxygen, this compound, although it might have other possibilities, probably has the following graphic formula:

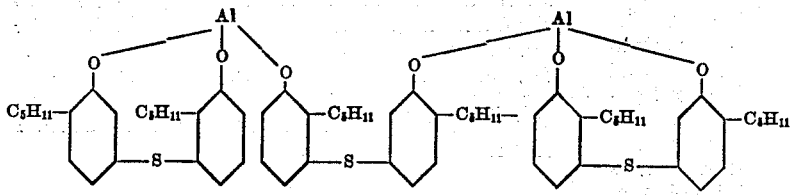

It should be understood that the position of the various substituents around the aromatic nucleus may be varied without departing from the scope of the invention.

A similar disulfide compound may be used in which the group —S— in the above graphic formula is replaced by the group

or, if preferred, by the group —S—S—, or even higher polysulfides may be used.

These various compounds can be produced by preparing the corresponding alkyl phenol sulfides or disulfides, which per se are known, and converting these into the corresponding sodium or potassium salts thereof, as by treatment with sodium or potassium hydroxide and then converting the resultant derivative of the group I metal into the corresponding derivative of aluminum, by suitable means such as by double decomposition of a suitable corresponding aluminum compound such as the chloride, nitrate, etc. If desired, the alkyl phenol sulfide may be converted directly into the corresponding aluminum salt by fusion with a mixture of aluminum chloride and sodium hydroxide, or by other means.

The invention may be described more broadly as comprising a compound having an alkyl substituted aryl aluminum oxide in which the oxygen of the aluminum oxide group is directly attached to the aryl nucleus and in which at least two alkylated aryl nuclei are interconnected by at least one atom of an element of the sulfur family, the alkyl radicals each containing at least four carbon atoms. One or more of the unreplaced hydrogen atoms of the aryl nucleus may be replaced by other elements, such as nitrogen, phosphorus, oxygen, sulfur and halogens, as in amino, nitro, phosphite, phosphate, hydroxy, alkoxy, sulfide, thioether, mercapto, chloro groups, and the like.

The following formulas illustrate types of substituted phenolic compounds whose aluminum salts can be prepared in accordance with the present invention:

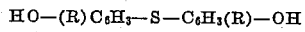
$HO-(R)C_6H_3-S-C_6H_3(R)-OH$

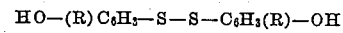
$HO-(R)C_6H_3-S-S-C_6H_3(R)-OH$

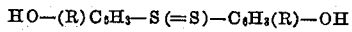
$HO-(R)C_6H_3-S(=S)-C_6H_3(R)-OH$

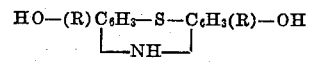
$HO-(R)C_6H_3-S-C_6H_3(R)-OH$
$\qquad\qquad\lfloor\!-\!NH\!-\!\rfloor$

$HO-(R)C_6H_3-S-C_6H_3(R)-(C_nH_{2n})-OH$

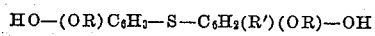
$HO-(OR)C_6H_3-S-C_6H_2(R')(OR)-OH$

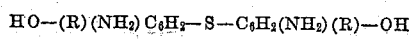
$HO-(R)(NH_2)C_6H_2-S-C_6H_2(NH_2)(R)-OH$

HO—(R)(OH)C₆H₂—S—C₆H₂(OH)(R)—OH

HS—(R)C₆H₃—S—C₆H₃(R)—OH

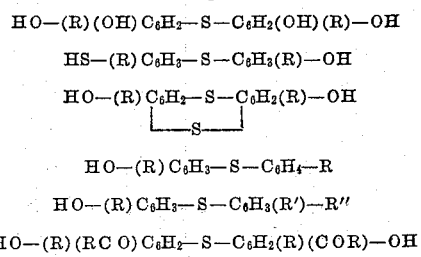

HO—(R)C₆H₃—S—C₆H₄—R

HO—(R)C₆H₃—S—C₆H₃(R')—R''

HO—(R)(RCO)C₆H₂—S—C₆H₂(R)(COR)—OH

The configurations of the compounds are not limited to certain positions in the illustrated structures, for the substituents may be in ortho, para, or meta relations to one another.

The aromatic nucleus may be polycyclic as in naphthalene, phenanthrene, diphenyl, etc.

As seen from the above description, the aluminum compounds of the present invention preferably have the general formula:

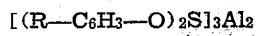

[(R—C₆H₃—O)₂S]₃Al₂

In this formula R represents one or more alkyl groups having enough carbon atoms, preferably at least 10, to insure solubility of the total compounds in mineral oil.

For the objects stated, the metal phenolates have been preferably prepared from phenolic compounds readily obtainable by synthetic alkylation of the simple phenols or by extraction from high boiling petroleum oils.

Suitable synthetic alkyl phenols for preparing the desired phenol sulfides are principally of the secondary and tertiary types, because alkylation of a simple phenol occurs more readily with branched aliphatic reactants. Commonly, the alkylation reaction involves a condensation of olefins with the simple phenols, the reaction being catalyzed by anhydrous metal halides, sulfuric acid, phosphoric acid, or certain activated clays. As olefinic reactants, refinery gases containing propylene, butylenes, amylenes, etc., are economically useful, although individual olefins, e. g. isobutylene, iso-amylene, di-isobutylene, triisobutylene, etc. or olefin-containing mixtures from other sources may be used. The reaction temperature is usually controlled to avoid side reactions. In employing sulfuric acid, a liquid phase reaction at relatively low temperatures is preferred; with phosphoric acid the reaction may be carried out in the vapor phase.

As starting materials for conversion into the metal phenol sulfides, the phenols may contain one or more substituents which provide a desired number of saturated carbon atoms in groups having the form of straight chains, branched chains, or even rings. Mono-alkyl or poly-alkyl phenols are synthesized conveniently by alkylating a phenol with a branched chain olefin polymer, such as diisobutylene, ditert-amylene, or other suitable agents, such as alcohols, alkyl sulfates, alkyl phosphates, or alkyl halides, thereby forming a carbon-to-carbon bond between the aromatic nuclei and the alkyl groups.

Petroleum phenols which qualify for the present purpose are considered to contain polymethylene or cycloalkyl side chains, as evidenced by their hydrogen and carbon analysis. The petroleum phenols are obtained by extraction of various stocks, chiefly from cracking process heating oil stocks, with caustic soda, and acidification of the alkaline extract with a weak mineral acid followed by a non-destructive distillation, if desired.

By using the described methods or any other well known method for preparing alkyl phenols, the following alkylated phenols, e. g., may be procured for preparing the phenolates: tert-amyl phenol, iso-hexyl phenol, tert-octyl phenol, ditert-butyl phenol, etc.

Inorganic substituents are introduced into alkyl phenols by well known methods. For example, an alkyl phenol, e. g. tert-amyl phenol, is reacted with sulfur mono-chloride, S₂Cl₂, in about a 1:½ mole ratio and preferably in a solvent such as dichlorethane, to produce the alkyl phenol disulfide. Using substantially the same procedure but substituting sulfur dichloride, SCl₂, for the monochloride, the alkyl phenols are given a thioether linkage substituent. Alkyl chlorphenols are obtained by chlorination, preferably controlled to replace nuclear hydrogen by a chloro group. This may be accomplished by chlorinating the phenol before alkylation. In such a manner, for example, 2-chlor-4-tert-amyl phenol can be produced. Nitro substituents are introduced readily into the aromatic nucleus by direct nitration, and nitro substituents can be reduced to amino groups. It is to be understood, however, that the preparation of substituted phenolic compounds which have been described does not form part of this invention and that any of the well known methods for their production may be used.

The invention will be better understood from a consideration of the following experimental data:

*Example 1*

39 parts by weight (⅒ mole) of tertiary amyl phenol thioether (made according to U. S. Patent 2,139,321) were dissolved in alcohol, and 5 parts by weight of an alcoholic solution of potassium hydroxide were slowly added with stirring, and the resulting alcoholic solution was evaporated to dryness on a steam bath. The residue was the potassium salt of tertiary amyl phenol thioether, which might otherwise be called the thioether of tertiary amyl potassium phenolate. (A slight excess of the phenol thioether was used to insure the absence of free alkali.)

*Example 2*

20 parts by weight of the potassium salts of tertiary amyl phenol thioether, prepared as described above in Example 1, were dissolved in absolute alcohol and 10.8 parts by weight of aluminum nitrate, Al(NO₃)₃.9H₂O, dissolved in absolute alcohol were slowly added to it. The mixture was evaporated to dryness and the residue was extracted with ether, filtered and evaporated to dryness. The final residue was an aluminum salt of tertiary amyl phenol thioether and it was soluble in oil.

*Example 3*

200 parts by weight (.51 mole) of tertiary amyl phenol thioether dissolved in absolute alcohol, were treated with 57.4 parts by weight (1.0 mole) of filtered alcoholic potassium hydroxide and the mixed solution was evaporated to dryness on a steam bath. The product, although not as soluble in mineral lubricating oil as the potassium salts prepared in Example 1 by the use of a slight excess of the tertiary amyl phenol thioether, was converted to the corresponding aluminum salt by adding an alcoholic solution of partially dried aluminum nitrate to an alcoholic solution of the potassium salt, using an excess of the aluminum nitrate. The mixed solution was extracted with ether and evaporated to dryness.

Example 4

173 parts by weight of tertiary amyl phenol thioether, 17.3 parts by weight of finely powdered sodium hydroxide, and 40 parts by weight of anhydrous aluminum chloride, were placed in a 3-necked flask. The latter was heated to 150° C. with stirring, and the bath was heated at 130-150° C. over night with continuous stirring. The residue was dissolved in ether and the ether solution was evaporated to dryness. The product was soluble in mineral oil and contained a substantial proportion of aluminum salt of tertiary amyl phenol thioether, although it apparently was not quite as pure as the aluminum salt prepared in Example 2.

Example 5

The potassium salt of tertiary amyl phenol thioether was prepared by neutralizing alcoholic solutions of potassium hydroxide and tertiary amyl phenol thioether as described above. Aluminum ethylate was prepared by adding aluminum chloride to anhydrous ethyl alcohol. The two alcohol solutions were mixed and then were allowed to stand on a water bath, filtered free of the slight precipitate and evaporated to dryness. The product was the aluminum salt of tertiary amyl phenol thioether, and was soluble in hydrocarbon oil. The product had the following chemical analysis, the theoretical value based upon the formula $[(C_5H_{11}.C_6H_3.O)_2S]_3Al_2$ being also given for the sake of comparison:

|  | Actual | Theoretical |
| --- | --- | --- |
| Per cent sulfur | 8.04 | 8.55 |
| Per cent $Al_2O_3$ | 8.55 | 9.0 |
| Per cent Al | 4.52 | 4.8 |

Example 6

The sodium salt of tertiary amyl phenol thioether was prepared in the same manner as used for potassium salt as described in Example 1 and the resulting sodium salt was treated with an absolute alcohol solution of aluminum chloride. The aluminum salt of tertiary amyl phenol thioether was produced and was found to be soluble in a Diesel oil having a viscosity of 55 seconds Saybolt at 210° F. The sodium salt used in the preparation of this aluminum compound had been prepared from a highly purified distilled tertiary amyl phenol thioether.

This procedure was repeated using a plant grade or relatively crude tertiary amyl phenol thioether as the starting material, but the resulting aluminum salt of tertiary amyl phenol thioether was likewise found to be soluble in the same Diesel oil.

Example 7

39 parts by weight (.1 mole) of tertiary amyl phenol disulfide were dissolved in alcohol and 16 parts by weight of caustic soda, also dissolved in alcohol, were added and the whole solution evaporated to dryness. The residue is the sodium salt of tertiary amyl phenol disulfide.

This sodium salt was dissolved in alcohol and mixed with an alcohol solution of aluminum nitrate. The precipitate which forms is the aluminum salt of tertiary amyl phenol disulfide and it is filtered out, washed twice with water, and dried.

Corresponding aluminum, etc. salts of other alkyl phenol sulfides may be prepared; for instance, by substituting polysulfides or polymers such as the dimers, trimers, and tetramers, of the alkyl phenol thioethers, disulfides, and the like, in place of the alkyl phenol thioethers used in the above examples. Also, the corresponding metal salts of the corresponding selenides and tellurides may be prepared, although the sulfur compounds are preferred.

The various products obtained may be purified, if desired, by fractional crystallization, extraction, precipitation with selective solvents, etc. Also, impurities may be removed by treatment with suitable adsorptive agents such as clay.

The new compounds of the present invention are useful as additives for mineral lubricating oils, in which they are particularly effective in inhibiting oxidation and the formation of sludge under the high temperature conditions of service in internal combustion engines.

This invention is not to be limited to any of the specific examples presented herein which were given solely for the purpose of illustration, but only by the following claims in which it is desired to claim all novelty inherent in the invention as far as the prior art permits.

We claim:

1. As a new chemical compound, an alkyl substituted aryl aluminum oxide having the structure

in which each of the three atoms of oxygen is a nuclear attached oxygen of an alkyl phenol sulfide, the said alkyl groups containing at least four carbon atoms per molecule.

2. As a new chemical compound, an aluminum salt of an alkylated phenol sulfide having the formula

in which the groups R, R', OH and $S_x$ are each connected to an aromatic nucleus ($C_6H_3$), R and R' represent alkyl groups ($C_nH_{2n+1}$), n being at least 4, and thereby rendering the said salt miscible in mineral lubricating oil, and x is an integer from 1 to 2, and in which all of the valences of the aluminum are satisfied by the alkylated phenol sulfide residues.

3. The aluminum salt of a tertiary amyl phenol sulfide in which all of the valences of aluminum are satisfied by the phenol sulfide residue.

4. An aluminum salt of an oil-soluble alkyl substituted phenol sulfide, each alkyl radical containing at least four aliphatic carbon atoms, in which all of the valences of the aluminum are satisfied by the phenol sulfide residues.

5. The method of preparing an aluminum salt of an alkyl phenol sulfide which comprises reacting an alkali metal salt of an alkyl phenol sulfide with an inorganic acid salt of aluminum.

6. A method according to claim 5 in which the alkali metal salt is a salt of di-tert.-amyl phenol sulfide.

7. A process according to claim 5 in which the alkali metal salt is a potassium salt of di-tert. amyl phenol sulfide and in which the inorganic acid salt of aluminum is aluminum nitrate.

8. A method according to claim 5 in which the alkali metal salt is the sodium salt of di-tert. amyl phenol sulfide and in which the inorganic acid salt of aluminum is aluminum chloride.

9. The method of preparing an aluminum salt of an alkyl phenol sulfide which comprises reacting an alkali metal salt of an alkyl phenol sulfide with an aluminum alcoholate.

10. A process according to claim 9 in which the aluminum alcoholate is aluminum ethylate.

PHARIS MILLER.
EUGENE LIEBER.

REFERENCES CITED

The following references are of record in the file of this patent:

UNITED STATES PATENTS

| Number | Name | Date |
|---|---|---|
| 2,125,961 | Shoemaker | Aug. 9, 1938 |
| 2,139,321 | Mikeska | Dec. 6, 1938 |
| 2,207,719 | Cohen et al. | July 16, 1940 |
| 2,229,528 | Shoemaker | Jan. 21, 1941 |
| 2,310,449 | Lightborn et al. | Feb. 9, 1943 |
| 2,361,803 | Wilson | Oct. 31, 1944 |
| 2,362,289 | Mikeska | Nov. 7, 1944 |
| 2,366,874 | Reiff | Jan. 9, 1945 |

FOREIGN PATENTS

| Number | Country | Date |
|---|---|---|
| 365,534 | Great Britain | Jan. 15, 1932 |
| 370,458 | Great Britain | Apr. 8, 1932 |
| 40,616 | France | July 27, 1932 |
| | (Addition to No. 704,635) | |

OTHER REFERENCES

Tassinari, "Gazetta Chimica Italiana," vol. 17, p. 92 (1887).